United States Patent [19]

DeKam

[11] Patent Number: 5,066,849
[45] Date of Patent: Nov. 19, 1991

[54] SOLDERING IRON FOR SURFACE MOUNTED COMPONENTS

[76] Inventor: Cornelius T. DeKam, 24565 Tamarack Circle, Southfield, Mich. 48075

[21] Appl. No.: 335,886

[22] Filed: Apr. 10, 1989

Related U.S. Application Data

[62] Division of Ser. No. 000,204, Jan. 2, 1987, Pat. No. 4,822,979.

[51] Int. Cl.⁵ .......................... H05B 1/02; B23K 3/02
[52] U.S. Cl. ..................................... 219/233; 81/9.44; 219/230; 219/241
[58] Field of Search ............... 219/221, 227, 233, 234, 219/235, 241; 81/9.44

[56] References Cited

U.S. PATENT DOCUMENTS

| | | | |
|---|---|---|---|
| 2,766,276 | 10/1956 | Arntzen | 81/9.44 |
| 3,673,384 | 6/1972 | Burman et al. | 81/9.44 |
| 3,752,017 | 8/1973 | Lloyd et al. | 219/233 X |
| 3,804,320 | 4/1974 | Vandermark | 219/230 X |
| 3,980,861 | 9/1976 | Fukunaga | 219/230 |
| 4,546,235 | 10/1985 | Kolter | 219/241 X |
| 4,553,021 | 11/1985 | Conti | 219/234 |
| 4,822,979 | 4/1989 | de Kam | 219/233 X |

FOREIGN PATENT DOCUMENTS 945402 12/1963 United Kingdom .............. 219/230

*Primary Examiner*—Anthony Bartis
*Attorney, Agent, or Firm*—Alex Rhodes

[57] ABSTRACT

An electrically heated soldering iron which is particularly adapted for surface mounting components on printed circuit boards. A unitary member rotatably joins together a pair of channel-shaped arms and resiliently biases the arms in a normally open position which is defined by a pair of overlapping members in the center portion of the iron. The arms are selectively moveable by a user toward each other to a closed position and the channel portions of the arms are adapted to retain the unitary member, the pair of overlapping members, and detachable assemblies of U-shaped soldering tips for applying heat to surface mounted electronic components. The U-shaped soldering tips are comprised of dissimilar conductors joined together to unitarily provide a soldering tip, heating element for heating the tip and a thermocouple for sensing the temperature of the tip.

12 Claims, 3 Drawing Sheets

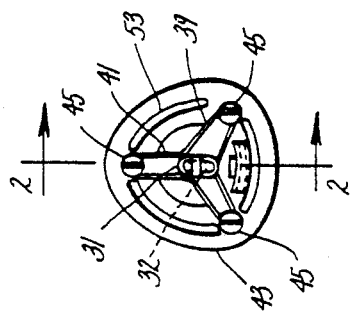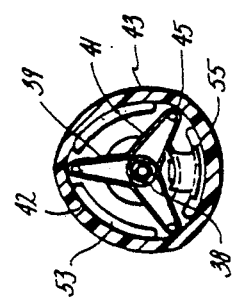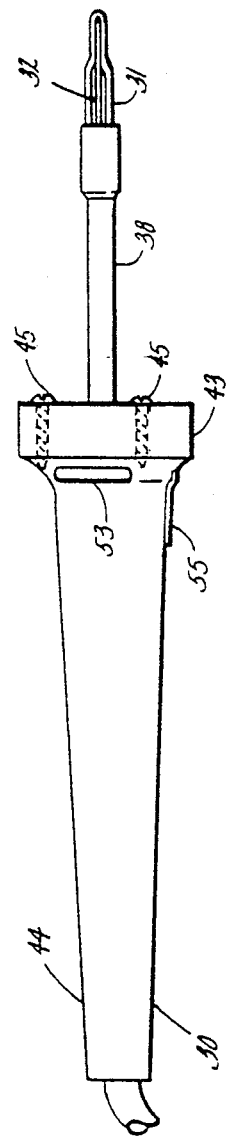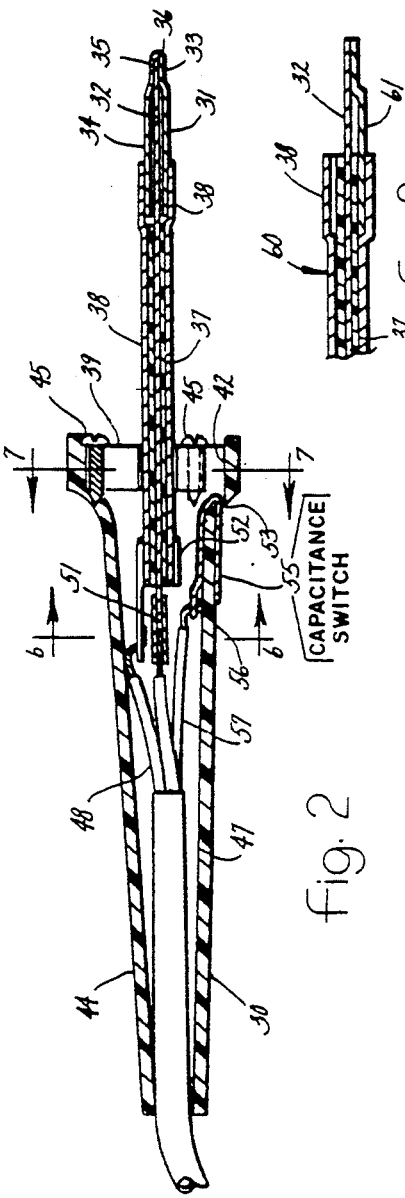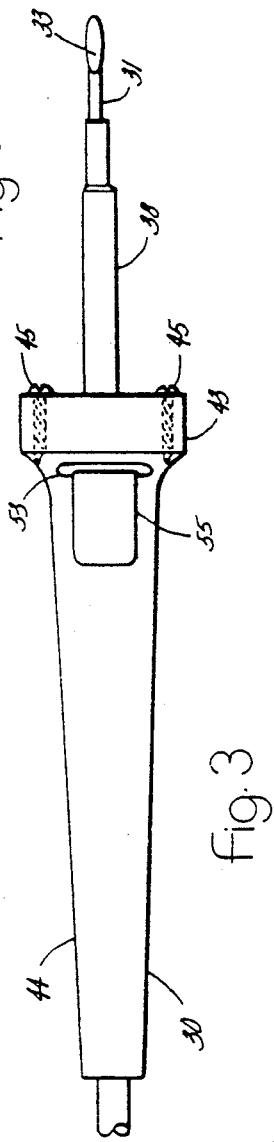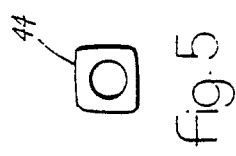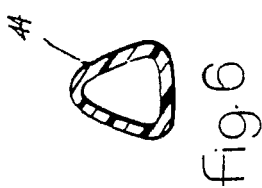

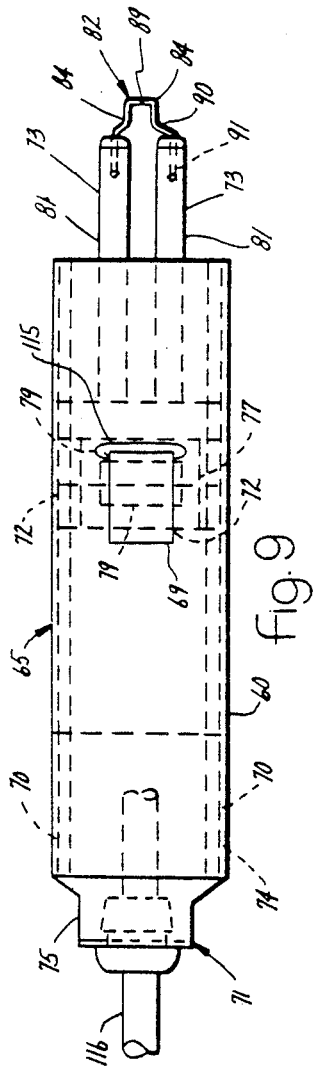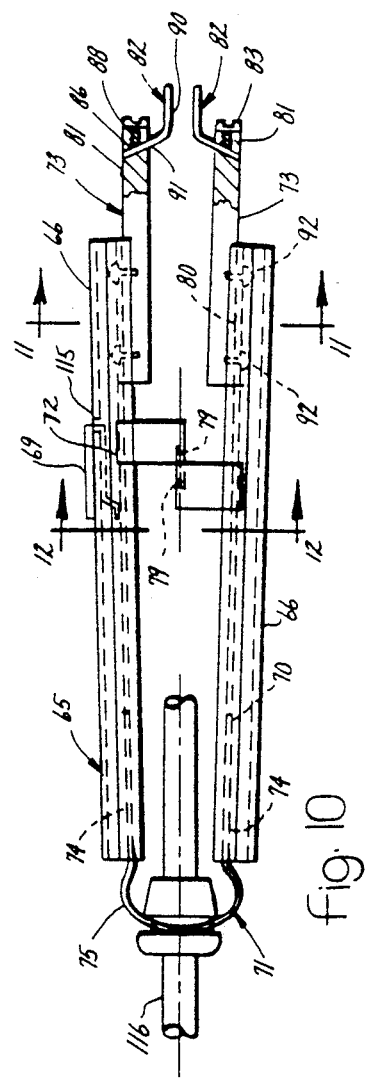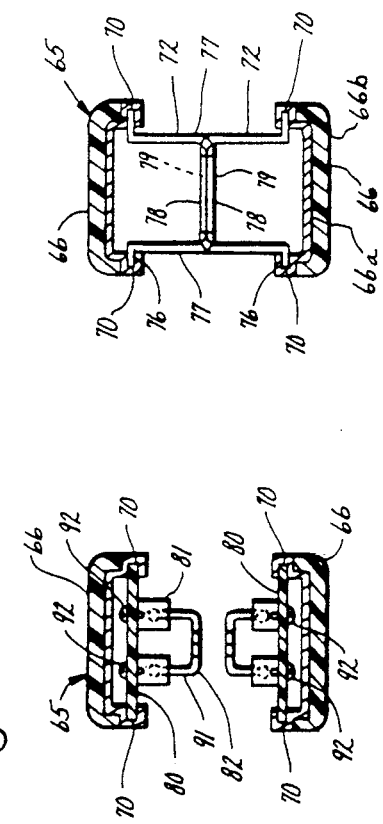

SOLDERING IRON FOR SURFACE MOUNTED COMPONENTS

This is a division of application Ser. No. 07/000,204, filed on Jan. 2, 1987 now U.S. Pat. No. 4,822,979, granted Apr. 18, 1989.

BACKGROUND AND SUMMARY OF THE INVENTION

This invention relates to temperature controlled soldering irons and more particularly to an electric soldering iron with improved means for controlling the temperature of the iron.

The well known construction of temperature controlled soldering irons is exemplified by Finch U.S. Pat. Nos. 2,897,335 and 3,699,306 and has a relatively massive iron tip, a heating element and a thermocouple. The thermocouple is attached to the iron tip at a point which is remote from where soldering is performed. The heating element and ends of the wire which connect the element and thermocouple to an external power supply and control circuit are housed in a tubular metal shank which is attached to the iron tip. A wooden or plastic handle is attached to the opposite end portion of the tubular shank.

One deficiency with this construction, that the present invention addresses, is that the temperature of the tip at the point where soldering is performed cannot be instantaneously controlled because of a time lag caused by the separation of the attachment of the thermocouple which senses temperature from the point of soldering.

Another deficiency is the slow warm-up of the tip because of the mass of the soldering tip and heating element. A result of the slow warm-up is that when soldering is not in process, the iron is generally maintained in a heated stand-by condition to avoid delays when soldering is to be done. This is both wasteful of electrical energy and detracts from the utility of battery operated models, because of the current drain on batteries.

Another deficiency with this construction is an undesirably high handle temperature because the iron is maintained in a heated condition and the method of attachment of the handle to the tubular shank.

It is further noteworthy that the new technology of surface mounting components to printed circuit boards and reductions in size and power rating of electronic components has increased the need for an improved temperature controlled soldering iron.

One important feature of the present invention is that a single pair of dissimilar conductors provides a soldering tip, a heating element and a means for directly sensing temperature at the point of soldering of the tip. Thus, complexity is reduced and the separation of the thermocouple attachment from the point of soldering is eliminated. It is needless to say reliability will be improved because of the reduced complexity. Moreover, the present invention provides the further benefits of reductions in size, weight, cost, and warm-up time of temperature controlled soldering irons.

Since the invention substantially reduces warm-up time, it follows that irons which embody the invention may be switched on and off, on an "as-needed" basis without loss of utility. Also, as will be appreciated, the reduced size and weight facilitates the handling and soldering small electronic components.

The present invention is an electrically heated soldering iron which is particularly adapted for surface mounting components on printed circuit boards. A unitary member rotatably joins together a pair of channel-shaped arms and resiliently biases the arms in a normally open position which is defined by a pair of overlapping members in the center portion of the iron. The arms are selectively moveable by a user toward each other to a closed position and the channel portions of the arms are adapted to retain the unitary member, the pair of overlapping members, and detachable assemblies of U-shaped soldering tips for applying heat to surface mounted electronic components. The U-shaped soldering tips are comprised of the dissimilar conductors joined together to unitarily provide the soldering tip, heating element for heating the tip and the thermocouple for sensing the temperature of the tip.

The conductors are in series with one another and the secondary winding of a transformer which provides A.C. current for heating the conductors. Transformers current is regulated by a triac in the external control circuit. An "on-off" switch is provided to operate the soldering iron on an "as-needed" basis.

When an A.C. current from the transformer flows through the conductors, the temperature of the conductors is raised and a D.C. voltage is generated by the conductors which is directly proportional to the temperature of the conductors. Since the conductors serve as the soldering tip, the D.C. voltage provides a signal for instantaneously sensing the temperature of the tip. The D.C. voltage is applied to the control circuit where it is amplified and compared against a reference voltage which is pre-selected, by a user, in accordance with a desired soldering temperature. The difference between the D.C. signal and reference voltage is applied to a triac which controls the current supplied by the transformer to the series connected dissimilar conductors.

Further features of the invention along with additional benefits and objects will become apparent by reference to the drawings and ensuing detailed description of the preferred embodiment of the invention which discloses the best mode contemplated in carrying out the invention. The subject matter in which exclusive rights is claimed is set forth in the numbered claims following the detailed description of the invention.

BRIEF DESCRIPTION OF THE DRAWINGS

FIG. 1 is a plan view of a temperature controlled soldering iron constructed in accordance with the invention.

FIG. 2 is a longitudinal sectional view taken on the line 2—2 of FIG. 4 showing the internal construction of the soldering iron.

FIG. 3 is a night side view of the soldering iron.

FIG. 4 is a right end view of the soldering iron.

FIG. 5 is a left end view of the soldering with the power omitted.

FIG. 6 is a sectional view taken on the line 6—6 of FIG. 2 with the internal parts omitted.

FIG. 7 is a sectional view taken on the line 7—7 of FIG. 2.

FIG. 8 is a partial sectional view of an alternate embodiment of the invention.

FIG. 9 is a plan view of another alternate embodiment.

FIG. 10 is a side view of the embodiment of FIG. 9.

FIG. 11 is a sectional view taken on the line 11—11 of FIG. 10.

FIG. 12 is a sectional view taken on the line 12—12 of FIG. 10.

DESCRIPTION OF THE PREFERRED EMBODIMENT

Figure 14:
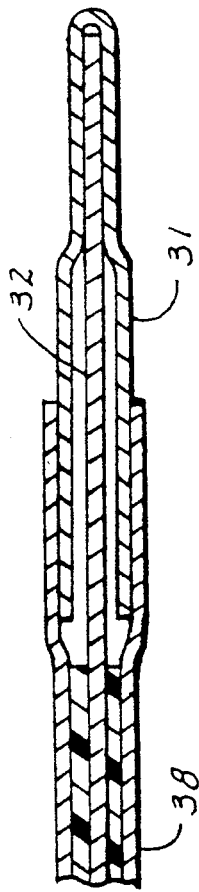
FIG. 14 is an enlarged partial view of FIG. 2 showing the tip of the soldering iron.

Referring now to the drawings wherein like numerals designate like and corresponding parts throughout the several views, in the temperature controlled soldering iron 30 illustrated therein there is provided a common pair of conductors 31, 32 which serve as a soldering tip, a heating element and a thermocouple for generating a D.C. voltage signal to control the temperature of the tip. The conductors are preferably made from combinations of materials commonly used for thermocouples, such as, Nichrome and Constantan and except for one of the end portions of the conductors 31, 32 which are joined together to form the soldering tip, they are spaced apart from each other in a side-by-side arrangement. Before or after joining, the end portions 33 are tapered as shown in FIG. 2 or as will be later seen formed into a variety of other shapes.

In the particular embodiment 30 illustrated in FIGS. 1 through 7 and 14 inclusive, one of the conductors 31 is folded into a modified U-shape. The other conductor 32, being straight, is disposed between the sides 34 of the folded conductor 31 with one end portion 35 tightly nested and preferably welded in the root 36 of the fold. Adjacent to the root 36 of the fold, the sides 34 of the folded conductor 31 are offset outwardly to space them apart from the straight conductor 32 which is centrally disposed between the sides 34 of the folded conductor 31.

As shown in FIG. 2, the straight conductor 32 is insulated with a suitable dielectric material 37, such as glass cloth, and tightly mounted in a thin metal tubular shank 38 by crimping an end portion of the shank 38 around the conductors 31, 32. The folded conductor 31 is preferably welded to the tubular shank 38 to provide a good electrical connection between the folded conductor 31 and shank 38.

At one end portion of the tubular shank 38, a short metal bracket 39 is fixed to the outer surface of the shank 38 by welding or some other suitable means. The bracket 39 is formed from a strip of thin metal or short length of thin tubing into three adjoining equally spaced folded spoke portions 41. The dissimilar conductors 31, 32, tubular shank 38 and bracket 39 comprise an assembly which can be conveniently replaced during service of the iron 30 or the installation of alternate soldering tips.

The bracket 39 is positioned in a circular recess 42 of the enlarged end portion 43 of a generally cylindrical handle 44 and is retained in the recess 42 by three small screws 45 which closely fit the arcuate end portions 46 of the three folded spokes 41 and threadably engage the handle 44. The circular recess 42 is a portion of the hollow interior 47 of the handle 44 through which the wires 48 to an external power supply (not shown) and control circuit (now shown) are routed.

The end portion 51 of the straight conductor 32, at the interior 47 of the handle 44, projects outwardly from the tubular shank 38 and with the inner end portion 52 of the shank 38 connects to the wires 48 of the external power supply and control circuit by soldering or other suitable means.

With reference to FIGS. 2 and 3, where the enlarged end 43 of the handle 44 joins the remaining portion of the handle, there is provided three radial ventilation slots 53 for cooling the handle 44. One slot 54 receives a U-shaped folded conductor 55 made from a thin flat strip of metal. The folded conductor 55 is a capacitance type switch for operating the soldering iron 30 on an "as-needed" basis. The end portion 56 of the capacitance switch 55 at the interior 47 of the handle 44 is joined to a wire 57 of the control circuit by soldering or other suitable means. It will be appreciated other types of conventional switches may be used in place of the capacitance switch.

Referring now to FIG. 7, the small area of contact of the tubular shank bracket 39 and handle 44 reduces handle temperatures by reducing conductive heat transfer from the tubular shank 38 to the handle 44. Handle temperatures may be further reduced by using bright finishes on the bracket and tubular sleeve to minimize radiation heat transfer to the handle 44.

Referring now to FIG. 8, another embodiment 60 is illustrated therein which in all respects is similar to the above embodiment 30 except for the use of a modified straight conductor 61 in place of the folded conductor 31. The conductor 61 is offset to space it apart from the other conductor 32.

In FIGS. 9 through 12, inclusive, an embodiment 65 of the invention is illustrated which is particularly adapted to surface mounting electronic components on printed circuit boards. In the embodiment 65 shown therein, a pair of generally rectangular arms 66 are pivotally joined together at one end portion and resiliently biased in a normally open position. As can be seen from the drawings, the arms 66 may be identical except for a slotted aperture 115, if a switch 69 of the type previously described is mounted in one of the arms 66.

In each arm 66 is a pair of grooves 70 into which a U-shaped leaf spring 71, a hat-shaped bracket 72 and soldering tip assembly 73 are press fitted. The leaf spring 71 has spaced apart straight portions 74, interconnected by a center loop portion 75 for pivotally joining the arms 66 and resiliently biasing them in the open position shown in FIG. 10. The side edge portions 74 of the leaf spring 71 engage the grooves 70 of the arms 66.

The hat-shaped brackets 72 are identical and each has short horizontal outer portions 76 which are press fitted into the grooves 70 of the arms 66, a pair of vertical straight portions 77 which adjoin the outer horizontal portions 76 and a horizontal straight center portion 78 which interconnects the vertical portions 77. In the center portion 78 of each bracket 72 there is a tab 79 which, in assembly, overlaps a similar tab 79 of the other bracket 72 for establishing the open position of the arms 66 and position the arms parallel to each other.

The soldering tip assemblies 73 are identical and comprise a generally rectangular flat insulator 80 which is press fitted into grooves 70 of corresponding arms 66, a pair of identical slender rectangular tip holders 81 attached by screws 92 or other suitable means to the center portion of the flat insulator 80, a U-shaped soldering tip 82, detachably mounted to the end portions of the rectangular holders 81, and a pair of screws 83 for detachably retaining the tip 82 in the holders 81 The soldering tip 82 is made of dissimilar wire conductors 84, 85 joined together by butt welding or other suitable means.

With reference to FIG. 10, in each of the tip holders 81 is a transverse aperture 86 which receives an end portion 91 of the soldering tip 82. At right angles to the transverse aperture there is an intersecting threaded aperture 88 which receives a screw 83 that retains the end portion 91 of the tip 82.

The shape of the tip 82 is best seen in FIG. 9. The generally U-shaped tip 82 consists of two symmetrically opposite members 84, 85 joined together by welding or other suitable means and comprises a center portion 89, side portions 90 and relatively short outer portions 91 which extend outwardly from the ends of the side portions 90. The side portions 90 are offset such that a relatively narrow center portion 89 is provided for access to small and confined areas of a workpiece (not shown).

Figure 13:
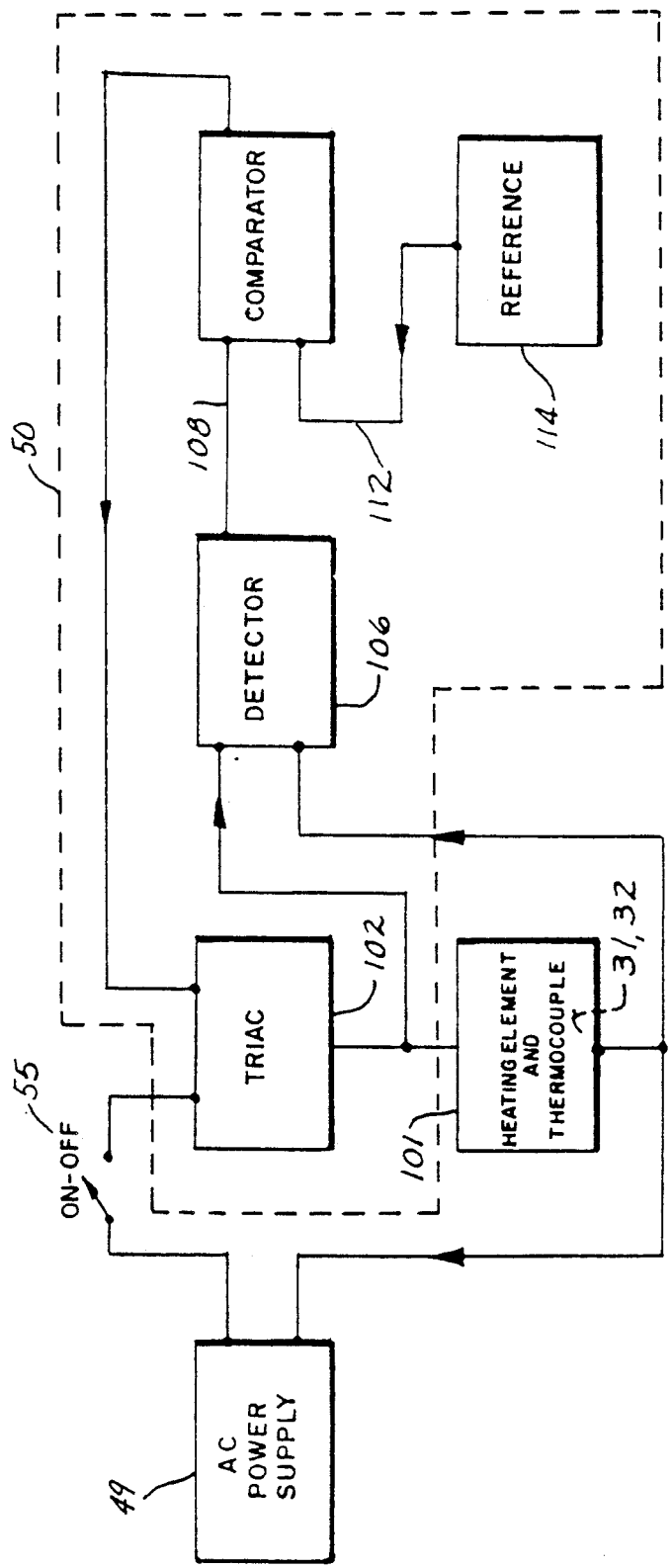
FIG. 13 is a schematic diagram of a power supply and control circuit.

FIG. 13 is a block diagram of the electrical circuit used with the soldering iron 30. It will be appreciated that since other circuits may be used for accomplishing the same ends, that the block diagram shown in FIG. 13 is not intended by way of limitation.

The circuit receives conventional A.C. power (115v, 60hz) and this power is preferably reduced in magnitude of voltage by a transformer which is included in the block 49 which designates the power supply.

The reduced magnitude voltage is delivered across the series combination of a triac 102 and the conductors 31, 32 which comprise the tip. When current at the reduced voltage is supplied to the conductors 31, 32, a temperature difference develops between the junction and opposite end portions of the dissimilar conductors 31, 32. These temperature effects are in addition to the normal heating of the conductors. Thus, the dissimilar conductors 31, 32 form a thermocouple 101 and a small voltage is developed across the ends of the conductors 31, 32 which varies directly with the temperature of the hot junction.

The triac 102 is an A.C. solid state switch which controls the current flow to the tip by selectively controlled conduction. Hence, the switch 102 serves to control the power flow into the tip and therefore controls the tip temperature.

A sensing circuit is associated with the tip and is illustrated as comprising conductors 31, 32 connecting to the two sides of the tip. This forms the input signal to the sensing circuit, specifically to a detector 106.

The detector 106 develops at its output a signal which is correlated with the temperature at the tip. This output signal appears at the line 108 which supplies the signal as one input to a comparator 110. Comparator 110 has a second input 112 which is connected to receive a reference signal from a reference source 114. The reference source is preferably a selectable voltage derived from a potentiometer and corresponds to a pre-selected soldering tip temperature.

Comparator 110 amplifies and compares the signal from detector 106 with the reference signal from reference source 114. The comparator output signal corresponds to the difference between the two signals. This output signal in turn controls the triac 102, and there is included a conventional triac firing circuit to cause the triac 102 to be fired in accordance with the level of the comparator 110 output signal.

The sensing circuit operates to control the power input to the tip in a manner such that the power input is caused to correspond to the setting of the reference 114. Hence, by adjusting the reference 114 to a desired setting, a desired tip temperature is achieved with the sensing circuit regulating the temperature closely to that which has been set. This is like a closed loop control of the tip temperature, but with the tip itself forming the thermocouple.

From the foregoing it is apparent that the present invention provides improvements in temperature controlled soldering irons which heretofore have not been available.

Although but several embodiments of the invention have been illustrated and described herein, it will be appreciated that other embodiments can be derived by changes in the material, size, shape, and arrangement of parts without departing from the spirit thereof.

I claim:

1. In an electrically heated soldering iron of the type having at least one soldering tip heated by an electric heating element, the improvement which comprises:

said soldering iron comprising a pair of said soldering tips, each tip comprising a pair of conductors made from dissimilar metals joined together to unitarily provide the soldering tip, the heating element and a thermocouple for sensing the temperature of the tip, an end portion of one conductor being joined to an end portion of the other conductor to provide the soldering tip and the other end portions of the conductors being operatively connected to a power supply such that when current is supplied to the conductors, the soldering tip is heated and a voltage is generated by said joined end portions indicative of the temperature of said tip;

a pair of channel-shaped arms each supporting one of said pair of soldering tips, said arms adapted to be rotatably joined together at one end portion and resiliently biased apart from each other to a normally open position, and selectively adjustable toward each other by a user to an operative position with said soldering tips in juxtaposition;

a unitary member attached to both of said arms for rotatably joining together said arms and resiliently biasing them apart from each other;

a pair of overlapping members attached to said arms for defining said normally open position;

means mounting said soldering tips to the other end of said arms; and said power supply operatively connected to said end portions of the dissimilar conductors for heating said conductors and generating a voltage indicative of the temperature of said conductors.

2. The soldering iron recited in claim 1 wherein said power supply is an A.C. power supply.

3. The soldering iron recited in claim 1 wherein one of said conductors is made from Nichrome and the other conductor is made from Constantan.

4. The soldering iron recited in claim 1 further comprising an on-off switch for operating the soldering iron.

5. The soldering iron recited in claim 1 wherein said pair of dissimilar conductors are made from dissimilar wires.

6. The soldering iron recited in claim 1 wherein the end portions of the dissimilar metal conductors which are joined together to form the soldering tip are parallel to said arms.

7. An electrically heated soldering iron which is particularly adapted for surface mounting components on printed circuit boards, comprising:

a pair of channel-shaped arms, said arms being rotatably joined together at one end portion and being resiliently biased apart from each other in a normally open position by a unitary member attached to both said arms and selectively adjustable toward each other by a user to an operative position;

a pair of members, one attached to each of said arms, arranged in overlapping relation to each other and cooperating to define said normally open position; and a pair of soldering tips, each detachably connected to the other end of a respective one of said arms.

8. The soldering iron recited in claim 7 wherein each of said soldering tips is a generally U-shaped member.

9. The soldering iron recited in claim 8 wherein at least one of said U-shaped soldering tips is comprised of two spaced apart symmetrically opposite members joined together and having a center portion, side portions and relatively short outer portions which extend outwardly from the ends of the side portions, said side portions being offset such that said center portion is relatively narrow for access to small and confined areas of a workpiece.

10. The soldering iron recited in claim 9 further comprising:

at least one of said soldering tips is comprised of a pair of conductors made of dissimilar metals joined together to unitarily provide said soldering tip, and electric heating element for heating said tip and a thermocouple for sensing the temperature of said tip; and a power supply operatively connected to the ends of said side portions of said dissimilar conductors for supplying current to said conductors to heat said conductors and thereby generating a voltage indicative of the temperature of said conductors.

11. The soldering iron recited in claim 10 wherein one end portion of one of said dissimilar conductors is connected to one end portion of the other dissimilar conductor for providing said soldering tip and the other end portions of the conductors are operatively connected to said power supply.

12. The soldering iron recited in claim 7 wherein said pair of overlapping members attached to said arms for defining said normally open position are identical hat-shaped brackets, each of said brackets having short horizontal outer portions which are press fitted into the channel portions of said arms, a pair of vertical straight portions which adjoin the outer horizontal portions and a horizontal straight center portion which interconnects the vertical portions, said straight center portions having tabs which overlap each other to define said normally open position of said arms.

* * * * *

UNITED STATES PATENT AND TRADEMARK OFFICE
CERTIFICATE OF CORRECTION

PATENT NO.   : 5,066,849
DATED        : November 19, 1991
INVENTOR(S)  : Cornelius T. DeKam It is certified that error appears in the above-identified patent and that said Letters Patent is hereby corrected as shown below:

Column 2, line 17, change "Transformers" to "Transformer"

Column 2, line 52, change "night" to "right"

Column 2, line 55, after "power" insert --cord--

Column 3, line 13, after "thermocouple" insert --means--

Signed and Sealed this

Second Day of March, 1993

*Attest:*

STEPHEN G. KUNIN

*Attesting Officer*  Acting Commissioner of Patents and Trademarks